(12) United States Patent
Tajima et al.

(10) Patent No.: US 6,291,045 B1
(45) Date of Patent: Sep. 18, 2001

(54) OPTICAL INFORMATION RECORDING MEDIUM

(75) Inventors: Toshiaki Tajima; Toru Fujii; Yuji Tomizawa; Emiko Hamada, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/354,908

(22) Filed: Jul. 16, 1999

(30) Foreign Application Priority Data

Jul. 17, 1998 (JP) .................................................. 10-218664

(51) Int. Cl.[7] .................................................... B32B 3/02

(52) U.S. Cl. ...................... 428/64.1; 428/64.2; 428/64.5; 428/64.8; 428/913; 430/205.18; 430/270.2; 430/495.1; 430/945; 369/283; 369/288

(58) Field of Search ................................... 428/64.1, 64.2, 428/64.5, 64.8, 913; 430/270.18, 270.19, 270.2, 495.1, 945; 369/283, 288

(56) References Cited

U.S. PATENT DOCUMENTS

| 5,312,714 | * | 5/1994 | Ogawa | 430/273 |
| 5,391,462 | * | 2/1995 | Arioka | 430/271 |
| 5,856,520 | * | 5/2000 | Hirako | 549/3 |
| 6,063,467 | * | 5/2000 | Kanno | 428/64.1 |

FOREIGN PATENT DOCUMENTS 10-181211   7/1998   (JP) .

* cited by examiner

*Primary Examiner*—Elizabeth Evans
(74) *Attorney, Agent, or Firm*—Birch, Stewart, Kolasch & Birch, LLP

(57) ABSTRACT

An optical information recording medium having a recording layer comprising a dye layer containing a trimethine-based cyanine dye having nitro group attached to a benzene ring or to a naphthalene ring, both being bonded to indole ring, is capable of minimizing the second peak in relative to the main peak shown in FIG. 1, thus enabling the spectrum consisting of a main peak and a second peak to become sharp. The recording layer is capable of performing the recording and reading with a laser beam having a wavelength falling within a range of 620 nm to 690 nm.

20 Claims, 3 Drawing Sheets

OPTICAL INFORMATION RECORDING MEDIUM

BACKGROUND OF THE INVENTION

This invention relates to an optical information recording medium of write once (through a heat mode) type such as DVD-R, which is capable of performing a recording or reading data by means of a laser beam of a shorter wavelength region.

With respect to the means for recording and reading data such as images of character and graphic, picture or voice, an optical disc having a recording layer containing a pentamethine-based cyanine dye is known as a CD-R which is capable of recording and reading with a laser beam of 770 to 830 nm in wavelength. Recently however, DVD-R (a digital video disc-recordable, or a digital versatile disc-recordable), which is capable of recording and reading in high density with a red laser beam of 620 to 690 nm in wavelength for instance, which is shorter than the laser beam employed in the aforementioned CD-R, is now propagated as new media of the next generation.

As shown in Japanese Patent Unexamined Application H10-181211, the present applicants have proposed an optical information recording medium having a recording layer containing a specific kind of trimethine-based cyanine dye as being useful for such a DVD-R.

However, a trimethine-based cyanine dye having a benzene ring or a naphthalene ring, both being bonded to indole ring as shown in the aforementioned Japanese Patent Application, is accompanied with problems that when a substituent group in the benzene ring or naphthalene ring is hydrogen atom, etc. other than nitro group, the absorption spectrum of the recording layer having a dye layer containing such a dye becomes as shown in FIG. 1. Namely, the absorbance $h_2$ of a second peak "b" representing an absorption due to the interaction and association between the dye molecules becomes too large in relative to the absorbance h1 of the main peak "a" representing an absorption by the dye molecule itself which is based on the band gap energy in the dye molecule. As a result, the peak consisting of the main peak "a" and the second peak "b" fails to become sharp, and a half value width "d" of the spectrum (the width of the spectrum consisting of the main peak "a" and the second peak "b" in relative to the absorbance of $h_1/2$) which represents the degree of the sharpness of peak also fails to become sufficiently small.

If the spectrum fails to become sufficiently sharp as mentioned above, the recording sensitivity or the absorbance per unit film thickness of a recording layer at the occasion of forming pits by making use of the irradiation of laser beam onto a recording layer cannot be sufficiently increased. This invites not only the problems that the thickness of the dye layer is required to be increased, the recording power is required to be increased, or the recording speed is required to be decreased, but also the problems that a so-called heat interference (wherein the deformation of the configuration of the pits may be caused due to the accumulation of heat at the space between the pits) tends to be brought about at the occasion of recording, thus giving a bad influence to the characteristics of the recording layer such as modulation amplitude or jitter.

BRIEF SUMMARY OF THE INVENTION

Therefore a first object of this invention is to provide an optical information recording medium having a recording layer which is capable of improving the ratio between the absorbance peak of a dye molecule and the association peak due to an association of the molecules in relative to a laser beam of shorter wavelength for the recording of the DVD in particular.

A second object of this invention is to provide an optical information recording medium which makes it possible to realize a recording material which is thin in film thickness and high in recording sensitivity to a laser beam of shorter wavelength for the recording of the DVD in particular.

A third object of this invention is to provide an optical information recording medium which is excellent in characteristics in terms of modulation amplitude, jitter, etc. in relative to a laser beam of shorter wavelength for the recording of the DVD in particular.

A fourth object of this invention is to provide an optical information recording medium which makes it possible to perform a high-speed recording with a small power in relative to a laser beam of shorter wavelength for the recording of the DVD in particular.

The present inventors have made an intensive study to solve the aforementioned problems and have finally found that a recording layer having a dye layer containing a trimethine-based cyanine dye having nitro group attached to a benzene ring or to a naphthalene ring, both being bonded to indole ring, is capable of minimizing the second peak in relative to the main peak shown in FIG. 1, thus enabling the spectrum consisting of a main peak and a second peak to become sharp.

Namely, according to this invention, there is provided (1) an optical information recording medium comprising a substrate on which a recording layer including a dye layer is formed; which is characterized in that said dye layer contains a trimethine-based cyanine dye represented by the following general formula [1]; and that said recording layer enables a recording and reading to be effected with a laser beam having a wavelength falling within a range of 620 nm to 690 nm.

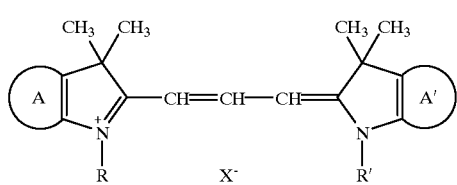

[1]

wherein "A" represents any one of the following general formulas [2], [3], [4] and [5];

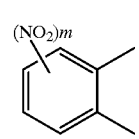

[2]

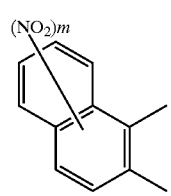

[3]

-continued

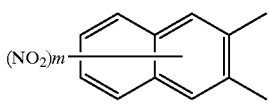
[4]

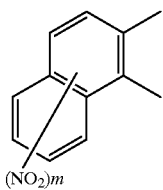
[5]

"A'" represents any one of the following general formulas [6], [7], [8] and [9];

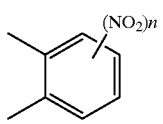
[6]

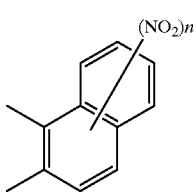
[7]

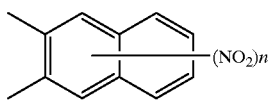
[8]

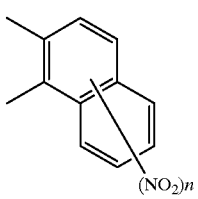
[9]

"A" and "A'" may be the same or different from each other (where m and n respectively represents an integer of 1 or more); R and R' may be the same or different from each other and are individually substituted or unsubstituted alkyl, carboxyl, alkoxycarbonyl, alkylcarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxyl, alkyl halide, alkylsulfonyl, alkylcarboxyl or alkylsulfonyl which are bonded to a metallic ion or alkyl, phenyl, benzyl, alkylphenyl, or phenoxyalkyl group (the hydrogen atom in the benzene ring portion and/or alkyl group portion may be substituted by a substituent group other than a metallic ion, such as alkyl, carboxyl, hydroxyl and a halogen atom); and X- is an anion selected from the group consisting of halogen atoms, PF6-, SbF6-, H3PO4, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid, SCN-, tetraphenyl borate and tungstic acid.

This invention also provides (2) an optical information recording medium of the aforementioned (1) wherein said dye layer further comprises, in addition to the trimethine-based cyanine dye represented by the aforementioned general formula [1], other kinds of dye at a ratio where the trimethine-based cyanine dye represented by the aforementioned general formula [1] occupies at least 50% by weight based on the total quantity of dyes.

This invention also provides (3) an optical information recording medium of the aforementioned (1) or (2) wherein said recording layer further comprises a metal complex.

In this invention, the recording layer is formed so as to enable the recording and reading to be effected with a laser beam having a wavelength falling within a range of 620 nm to 690 nm. This, in turn, means that the recording layer is made available for use in DVD-R.

The expression of the "recording layer" means in this invention not only a recording layer comprising a single or plural dye layers enabling pits to be formed thereon with a laser beam, but also an enhancing layer made of a resin for instance for adjusting the refractive index or film thickness of the optical information recording medium with a view to adjust the optical property of the optical information recording medium, and also an intermediate layer to be interposed between a substrate and a dye layer or between a plurality of dye layers.

The aforementioned trimethine-based cyanine dye contained in the dye layer and represented by the aforementioned general formula [1] can be optionally selected from those wherein "A" is optionally selected from the general formulas [2], [3], [4] and [5], "A'" is optionally selected from the general formulas [6], [7], [8] and [9], and "A" and "A'" can be optionally combined. For example, the compounds of the general formulas [2] may be optionally combined with any one of the compounds of the general formulas [6], [7], [8] and [9]. Likewise, the compounds of the general formulas [3], [4] and [5] may be optionally combined with any one of the compounds of the general formulas [6], [7], [8] and [9]. The "m" and "n" in the substituent groups $(NO_2)m$ and $(NO_2)n$ in "A" and "A'" are individually an integer of 1 or more. These dyes may be employed singly or in combination of two or more kinds.

FIG. 1 illustrates the absorbance to the wavelength of a laser beam when a recording layer having a dye layer containing a trimethine-based cyanine dye having nitro group attached to a benzene ring or to a naphthalene ring, both being bonded to indole ring, is irradiated with the laser beam. Namely, the ratio in absorbance of the main peak "a" to the second peak "b" ($h_2/h_1$) can be made into less than 0.8, and at the same time, the half value width "d" of the spectrum consisting of the main peak "a" and the second peak "b" can be made less than 100 nm.

By contrast, when other kinds of substituent group (for example, hydrogen atom) are employed in place of nitro group constituting a substituent group of A and A' in the aforementioned general formula [1], the absorbance ratio ($h_2/h_1$) cannot be made into less than 0.8, i.e. it would become 0.8 or more, and also, the half value width "d" of the spectrum cannot be made less than 100 nm, i.e. it would become 100 nm or more.

It become possible, when nitro group is introduced into the benzene ring or naphthalene ring which are bonded to the indole ring of trimethine-based cyanine dye as mentioned above, to minimize the second peak and to enable the spectrum consisting of the main peak and the second peak to become sharp. As a result, the absorbance per unit film thickness of the recording layer can be increased and hence, the recording efficiency can be enhanced, i.e. so-called recording sensitivity can be improved. When the recording sensitivity can be improved in this manner, the film thickness of the recording layer can be made thinner as compared with the conventional recording layer, or not more than 70 nm, and even if the film thickness of the recording layer is not more than 70 nm, it is possible to enable the modulation amplitude to meet the present standards. Further, since the film thickness is made relatively thin, the accumulation of heat between pits at the moment of recording can be suppressed, thereby making it possible to inhibit the deformation of configuration of the pits due to the accumulation of heat (or so-called heat interference phenomenon) and to improve the jitter characteristics.

If the recording sensitivity can be improved and at the same time, the characteristics regarding the modulation amplitude, jitter, etc. can be improved in this manner, it becomes possible to reduce the power for recording and enhance the recording speed.

The recording layer according to this invention may include one or more kinds of additional dye other than the trimethine-based cyanine dye represented by the aforementioned general formula [1], this additional dye being included in the same dye layer as that of the trimethine-based cyanine dye or in a separate dye layer. In this case, when the trimethine-based cyanine dye represented by the aforementioned general formula [1] is included at ratio of not less than 50% by weight based on the total quantity of the dyes, it is still possible to enable the recording layer to meet the present standards though the characteristics such as the modulation amplitude and jitter may be somewhat deteriorated as compared with the recording layer where the aforementioned additional dye is not included at all.

As for the aforementioned additional dye, trimethine-based cyanine dyes represented by the following general formula [10] can be employed.

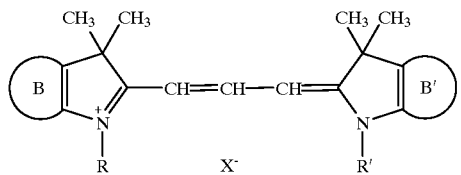

[10]

wherein "B" represents any one of the following general formulas [11], [12], [13] and [14];

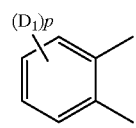

[11]

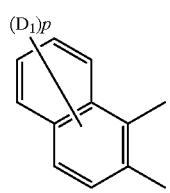

[12]

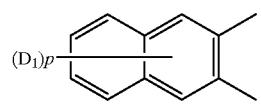

[13]

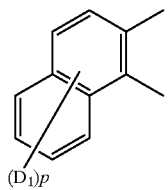

[14]

"B'" represents any one of the following general formulas [15], [16], [17] and [18];

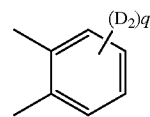

[15]

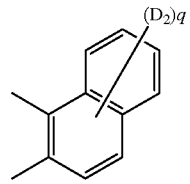

[16]

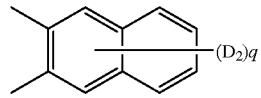

[17]

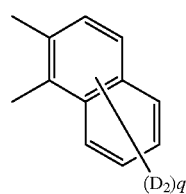

[18]

"B" and "B'" may be the same or different from each other (where $D_1$ and $D_2$ may be the same or different from each other and are individually hydrogen atom, alkyl, alkoxyl, hydroxyl, halogen atoms, carboxyl, alkoxycarbonyl, alkylcarboxyl, alkylhydroxyl, aralkyl, alkenyl, alkylamide, alkylamino, alkylsufonamide, alkylcarbamoyl, alkylsulfamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapt, chlorosulfone, alkylazomethine, alkylaminosulfone, vinyl or sulfone group; p and q respectively represents the number of substituent groups, which is an integer of 1 or more; (however, the case where $D_1$ and $D_2$ are simultaneously nitro group is excluded); and "R" and "R'" are the same as those of the aforementioned general formula [1]).

In the aforementioned general formula [10], "B" can be optionally selected from the aforementioned general formulas [11], [12], [13] and [14], "B'" can be optionally selected from the general formulas [15], [16], [17] and [18], and "B"

and "B'" can be optionally combined. For example, the compounds of the general formulas [11] may be optionally combined with any one of the compounds of the general formulas [15], [16], [17] and [18]. Likewise, the compounds of the general formulas [12], [13] and [14] may be optionally combined with any one of the compounds of the general formulas [15], [16], [17] and [18]. The "p" and "q" in the substituent groups $(D_1)p$ and $(D_2)q$ in "B" and "B'" are individually an integer of 1 or more.

As for the method of synthesizing the dyes represented by the aforementioned general formulas [1] and [11], the method set forth in "The Chemistry of Synthetic Dyes, Vol. 14" may be employed.

The trimethine-based cyanine dye represented by the general formulas [1] and a combination of this trimethine-based cyanine dye and the aforementioned additional dye may be exclusively employed. Additionally, in view of improving the light resistance of the recording layer, a metal complex may be included as a light-stabilizing agent in the dye layer or in another layer.

As for such a metal complex, the following compounds represented by the following general formulas [19] may be employed.

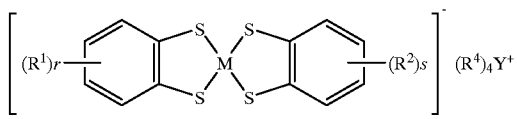

[19]

wherein $R^1$ and $R^2$ are respectively $SO_2R^3$ ( $R^3$ is represented by the general formula [20])

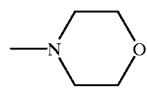

[20]

halogen atom, phenyl, alkyl, cyano, thioalkyl or alkylsulfonyl; r and s are respectively an integer of 1 to 4; $R^4$ is alkyl group; Y is N or P; and M is a metal such as Cu, Co and Ni.

Specific examples of compounds belonging to the aforementioned general formula [19] include, in addition to the those shown in the following Examples, the compounds represented by the following general formulas [21] and [22].

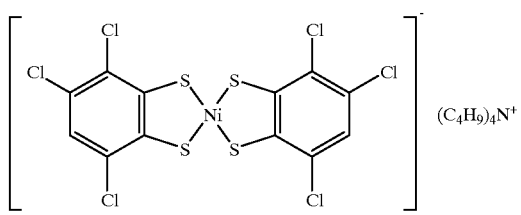

[21]

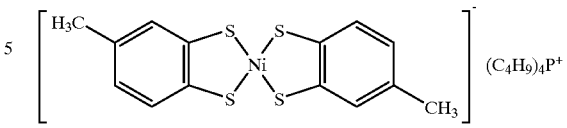

[22]

The manufacture of the optical information recording medium according to this invention can be performed as follows.

First of all, a solution containing a cyanine dye represented by the aforementioned general formula [1], a solution containing this cyanine dye and a different kind of cyanine dye represented by the aforementioned general formula [10] or the aforementioned additional dye (the cyanine dye represented by the aforementioned general formula [1] should preferably be included at ratio of 50% by weight or more), or a solution which further contains, in addition to the aforementioned dyes, a metal complex represented by the aforementioned general formula [19] is dissolved in a solvent to obtain a dye solution, which is then coated on a transparent substrate. The solvent to be employed in the preparation of this dye solution may be selected from chloroform, dichloroethane, a fluorine-based solvent such as fluorinated alcohol, methylethyl ketone, dimethylformamide, methanol, toluene, cyclohexanone, acetylacetone, diacetone alcohol, cellosolves such as methyl cellosolve, and dioxane. The mixing ratio of the cyanine dye in this case should preferably be 1 to 10% by weight.

As for the material for the substrate to be employed in this invention, glass, or plastics such as epoxy resin, methacryl resin, polycarbonate resin, polyester resin, polyvinyl chloride resin and polyolefin resin may be employed. The substrate may be provided in advance with tracking grooves or pits, which may be provided with a signal required for an address signal.

The coating of the aforementioned cyanine dye on a substrate should preferably be performed by means of a spin-coating method. The film thickness after being dried of the dye layer may be the same as that adopted for DVD-R.

The recording layer according to this invention may contain a singlet oxygen quencher excluding the aforementioned metal complex, a light absorbent, a radical scavenger, etc.

The optical information recording medium according to this invention may include a reflection layer in addition to the recording layer. This reflection layer may be provided on its surface with a protective layer. This protective layer may also be deposited on the exposed surface (the surface from which a laser beam is irradiated) of the substrate.

As for the reflection layer, a film of high reflectivity, such as a metallic film may be employed. This metallic film can be formed by the vapor-deposition or sputtering of a metal such as Au, Al, Ag, Cu, Pt, an alloy comprising any of these metals or other kinds of metal, or an alloy containing other trace component. The protective layer is formed for the purpose of protecting or improving the optical information recording medium, and can be formed by coating a solution of a radiation cure type resin (such as an ultraviolet cure type resin) on a given surface by means of spin coating for instance and then radiation-curing the coated layer.

As a result, an optical disc comprising a substrate provided on its surface with a recording layer, an reflection layer and additionally a protective layer, etc. can be obtained. The optical disc comprising at least a recording layer as an essential layer and any other optional layer(s) may be superimposed on another optical disc comprising at least a recording layer as an essential layer and any other optional layer(s), or one substrate may be laminated on another substrate of an optical information recording medium.

The adhesives and methods for forming this laminated structure may be suitably selected by making use of an ultraviolet-curing resin, a cationic-curing resin, a pressure sensitive adhesive double coated tape, a hot-melt method, a spin-coating method, a dispense method (extrusion method), a screen printing method, a roll coating method, etc.

DETAILED DESCRIPTION OF THE INVENTION

Figure 1:
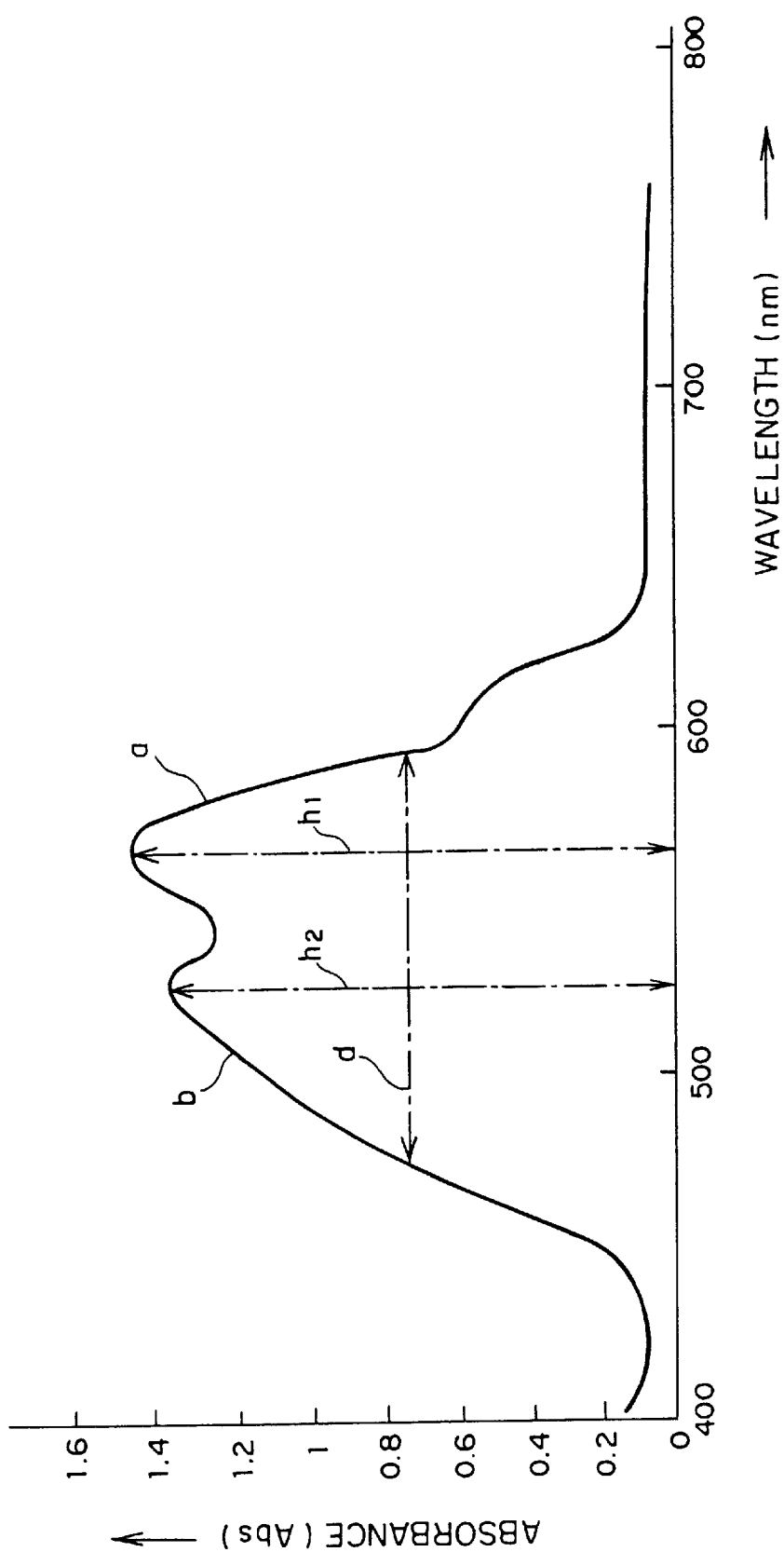
FIG. 1 is a graph showing an absorption spectrum of a recording layer comprising a dye layer containing a trimethine-based dye (a dye belonging to the aforementioned general formula [10]) which does not belong to the aforementioned general formula [1] of this invention.

This invention will be further explained in detail with reference to the following preferred embodiments.

A polycarbonate substrate provided with a track pitch 0.74 μm in length (it may be 0.80 μm) and only wobble signal (pre-pit may also be included) was employed. Trimethine-based cyanine dyes for the dye layer of a recording layer were selected as follows. Namely, an indolenine-based trimethine cyanine dye represented by the aforementioned general formula [1] where (1) a dye formed of a combination of the general formulas [2] and [6]; (2) in particular, a dye wherein m and n are both 1; (3) R and R' are the same kind of group selected from alkyl or phenylalkyl group (lower alkyl group) mainly having 8 carbon atoms and having no branch; (4) in particular, $X^-$ is an anion of perchloric acid was selected. Then, a solution of dye meeting the aforementioned conditions (1) to (4) was respectively prepared. Additionally, a solution containing a dye meeting the aforementioned conditions of (1) to (4) and a metal complex belonging to the aforementioned general formula [19] where $R^3$ is represented by the general formula [20] was prepared. Furthermore, a solution containing 60 to 70% by weight (based on the total quantity of dyes) of a dye meeting the aforementioned conditions (1) to (4), and another kind of indolenine-based trimethine cyanine dyes represented by the aforementioned general formula [10] where (5) a dye formed of a combination of the general formulas [11] and [16]; (6) in particular, a dye wherein $D_1$ and $D_2$ are both hydrogen atom, (7) R and R' are different from each other and selected from a lower alkyl group having 3 or 4 carbon atoms; (8) in particular, $X^-$ is an anion of iodine was prepared. Then, each solution was spin-coated on the polycarbonate substrate to form a dye layer having a film thickness of 50 to 70 nm.

In this case, the absorption spectrum of each of the recording layers could be controlled to 0.8 or less, more preferably 0.6 to 0.75 in absorbance ratio of the absorption peaks ($h_2/h_1$ shown in FIG. 1) and at the same time, the half value width "d" of the spectrum consisting of the main peak "a" and the second peak "b" could be controlled to 100 nm or less, more preferably 80 nm to 100 nm.

Thereafter, a reflection layer consisting of Au or Al was deposited on the dye layer by means of sputtering. A protective layer comprising an ultraviolet-curing resin was further spin-coated on the reflection layer. Then, a pair of the optical discs thus obtained were superimposed via an adhesive layer comprising an ultraviolet-curing resin which was spin-coated on the polycarbonate substrate, thereby obtaining a laminated-disc type optical disc.

Then, a laser beam of 620 nm to 690 nm was irradiated onto these optical discs thereby to perform a recording, finding that an improvement in characteristics such as modulation amplitude and jitter. As compared with the optical disc where only a dye meeting the aforementioned conditions (5) to (8) was employed, and a dye meeting the aforementioned conditions (1) to (5) and belonging to the aforementioned general formula [1] was not employed, these optical discs enabled to minimize the power for recording, and to increase the recording speed when the same power for recording as that of the conventional optical disc was employed.

This invention will be further explained in detail with reference to the following examples.

EXAMPLE 1

A transparent polycarbonate substrate having a thickness of 0.6 mm, an outer diameter of 120 mm and provided with a spiral groove 0.32 μm in width, 100 nm in depth and 0.74 μm in pitch was molded by means of an injection molding method.

Then, a trimethine-based cyanine dye represented by the following general formula [23] (Nippon Kankoh-Shikiso Kenkyusho Co., Ltd.) and a metal complex represented by the following general formula [24] as a light-stabilizing agent were mixed together at a weight ratio of 95:5 to obtain a mixture. Then, this mixture was dissolved in 2,2,3,3-tetrafluoro-1-propanol (Tokyo Kasei Kogyo Co., Ltd.; hereinafter referred to as TFP) to obtain a solution containing 3% by weight of the aforementioned mixture. This solution was then coated on the substrate by means of a spin-coating method to obtain a recording layer consisting of a photosensitive dye film having a film thickness of 60 nm.

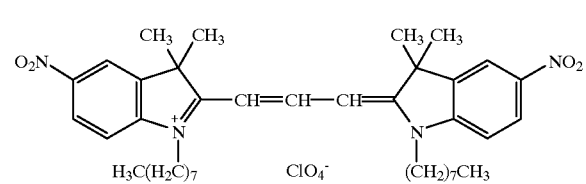

-continued

[24]

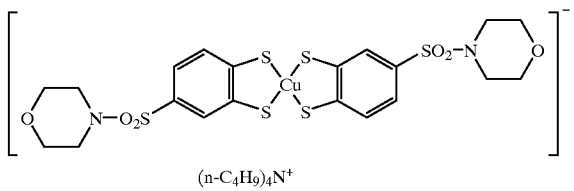

(n-C$_4$H$_9$)$_4$N$^+$

Figure 2:
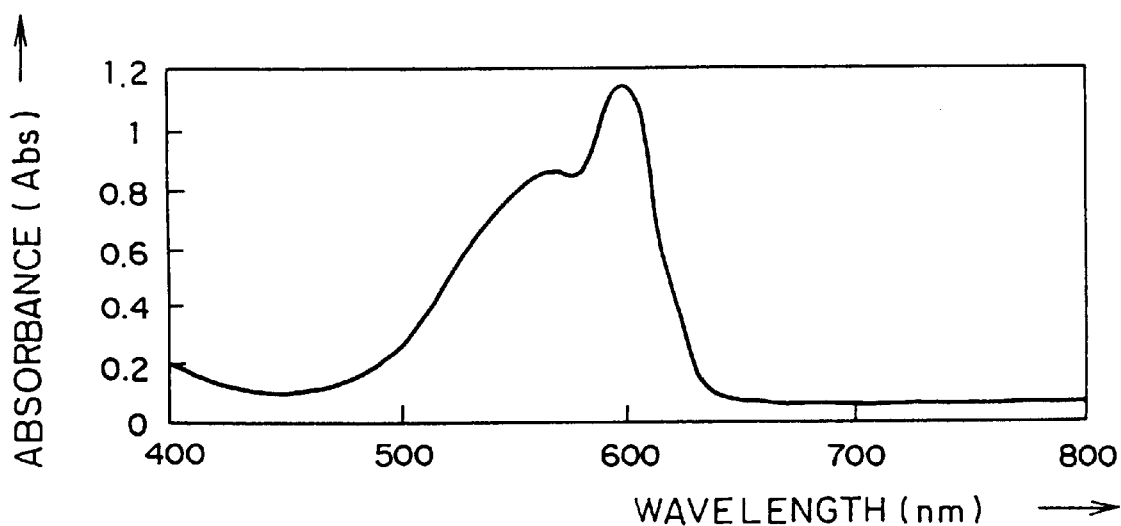
FIG. 2 is a graph showing an absorption spectrum of a recording layer comprising a dye layer containing a dye representing one example of the dyes belong to the aforementioned general formula [1] of this invention.

When the absorption spectrum of the recording layer (the wavelength dependency of the absorbance (Abs) under a wavelength ranging from 400 to 800 nm) was measured by making use of a visible ultraviolet spectrometer (U-4000; Hitachi, Ltd.) to obtain the spectrum as shown in FIG. 2. The absorbance ratio of the second peak to the main peak (corresponding to the absorbance ratio h$_2$/h$_1$ in FIG. 1) was 0.74, and the half value width of the spectrum (corresponding to the width of the spectrum consisting of the main peak and the second peak at h$_1$/2 in FIG. 1) was 96 nm.

Next, a reflection layer consisting of an Au film having a film thickness of 80 nm was formed, by means of sputtering method, on the surface of a portion (a region 44 mm to 117 mm in diameter) of the recording layer deposited on the substrate.

Furthermore, an ultraviolet-curing resin (SD-211; Dainippon Ink & Chemicals Inc.) was spin-coated on the surface of the reflection layer, and then allowed to cure by irradiating ultraviolet rays to the coated layer to obtain a protective film having a film thickness of 5 μm.

Then, an ultraviolet-curing resin (SD-318; Dainippon Ink & Chemicals Inc.) was dripped on the protective film on the portion of the recording layer. Thereafter, another substrate which was molded in the same manner as mentioned above was placed on the surface of the substrate carrying thereon the aforementioned ultraviolet-curing resin. After the resin interposed between these substrates was allowed to disperse by means of a spin-coating method, ultraviolet rays was irradiated, via the substrate which was molded in the same manner, to the ultraviolet-curing resin to cure it, thereby forming an adhesive region 25 μm in thickness and 32 mm to 120 mm in diameter and obtaining a laminated-disc type optical disc.

Then, a recording was performed on this optical disc by making use of a recording machine (DDU-1000; numerical aperture=0.6, and laser wavelength=635 nm; Pulsetec Industries Co., Ltd.) under a linear velocity of 3.5 m/sec., and the jitter was measured by making use of a time interval analyzer (TA-320; Yokogawa Electric Co., Ltd.). According to the DVD Specification for Read-Only DISC, the Data to Clock Jitter (jitter) is a data which can be obtained by normalizing the deviation value σ of the binarize.data.edge signal by taking the channel bit rate=26.6 Mbps (38.23 nsec) as a standard clock. The evaluation of jitter is determined based on 8–16 signal modulation where the minimum pit length is set to 0.4 μm and the linear velocity is set to 3.5 m/sec. The value of jitter should be at most 9% or preferably 8.5% or less in view of preventing an accidental demodulation (decord) of the signal.

Furthermore, the modulated amplitude after recording (I$_{14}$/I$_{top}$) was also measured by making use of a laser beam 650 nm in wavelength. In this case, the value of I$_{top}$ is a maximum reflection light quantity under HF (EFM) signal and almost identical with the value of a maximum reflection light quantity of I$_{14}$. This I$_{14}$ is a signal of optical modulation component which can be derived from a difference in light quantity between the light quantity that is diffracted at the longest pit to be recorded in the groove to be recorded and then returned to the objective lens and the light quantity that is reflected at the non-pit portion and then returned to the objective lens.

Then, a light resistance test was performed on the above-obtained optical discs by way of W.O.M. (Weather-Ometer). The measurement was performed using Atras Weather-Ometer C135A (Toyo Seiki Seisakusho) under the conditions of 30° C. in temperature, 70 to 80% in relative humidity, 80 hours in irradiation of light of 6.5KW on the main surface of the disc using xenon light source, thereby to obtain the modulated amplitude (I$_{14}$/I$_{top}$) after and before the recording. The results of the measurements are shown in Table 1. By the way, the standard values which are presently in force are also shown in Table 1.

TABLE 1

| | Absorption ratio (h$_2$/ h$_1$ in FIG. 1) | Half value width (nm) ("d" in FIG. 1) | Jitter (%) | Modulation I$_{14}$/I$_{top}$ (%) | |
|---|---|---|---|---|---|
| | | | | Before test | After test |
| Standards | — | — | <9 | >60 | >60 |
| Example 1 | 0.74 | 96 | 8.0 | 70 | 65 |
| Example 2 | 0.77 | 98 | 8.0 | 72 | 68 |
| Example 3 | 0.79 | 99 | 8.5 | 66 | 62 |
| Example 4 | 0.77 | 98 | 8.0 | 74 | 20 |
| Comp. Ex. 1 | 0.97 | 130 | 15.0 | 70 | 15 |

This Example illustrates a case where a trimethine-based cyanine dye represented by the general formula [1] wherein A and A' are both a benzene ring having one nitro group, and B and B' are both the same kind of alkyl group having 8 carbon atoms. It will be seen that this optical disc is capable of recording by a laser beam of 635 nm in wavelength and of reading by a laser beam of 650 nm in wavelength, that the modulation amplitude is also high, and that the jitter is not so high. Furthermore, in view of the modulated amplitude obtained after and before the recording, the light resistance of the recording layer is good.

EXAMPLE 2

Figure 3:
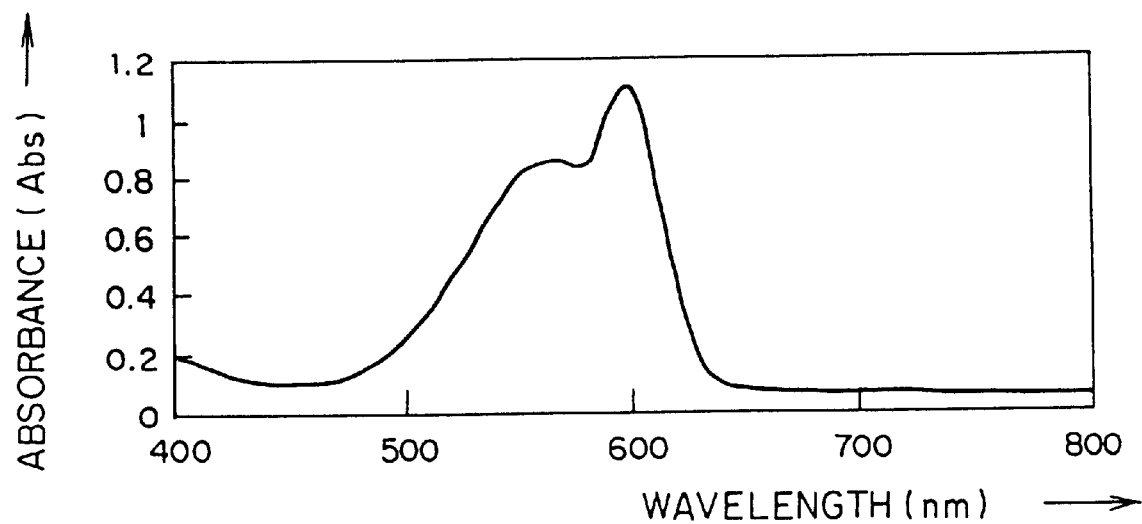
FIG. 3 is a graph showing an absorption spectrum of a recording layer comprising a dye layer containing a dye representing another example of the dyes belong to the aforementioned general formula [1] of this invention.

An optical disc was manufactured by forming a recording layer comprising a dye layer and processing the recording layer in the same manner as illustrated in Example 1 except that a trimethine-based cyanine dye represented by the following formula [25] belonging to the general formula [1] was substituted for the trimethine-based cyanine dye NK-2084. Then, the measurement was performed on this recording layer in the same manner as illustrated in Example 1, the results of measurements being shown in Table 1 and in FIG. 3. The measurements on the optical disc were also performed in the same manner as described in Example 1, the results of measurement being shown in Table 1.

[25]

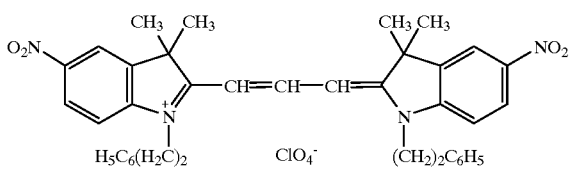

Although the dye employed for the optical disc of this example was altered from that employed in Example 1 in that R and R' were formed of the same kind of phenylethyl group, it was possible to perform the recording with a laser beam of 635 nm in wavelength and to perform the reading with a laser beam of 650 nm in wavelength. Jitter was not so high, and the modulation amplitude was slightly better than that of Example 1.

EXAMPLE 3

Figure 4:
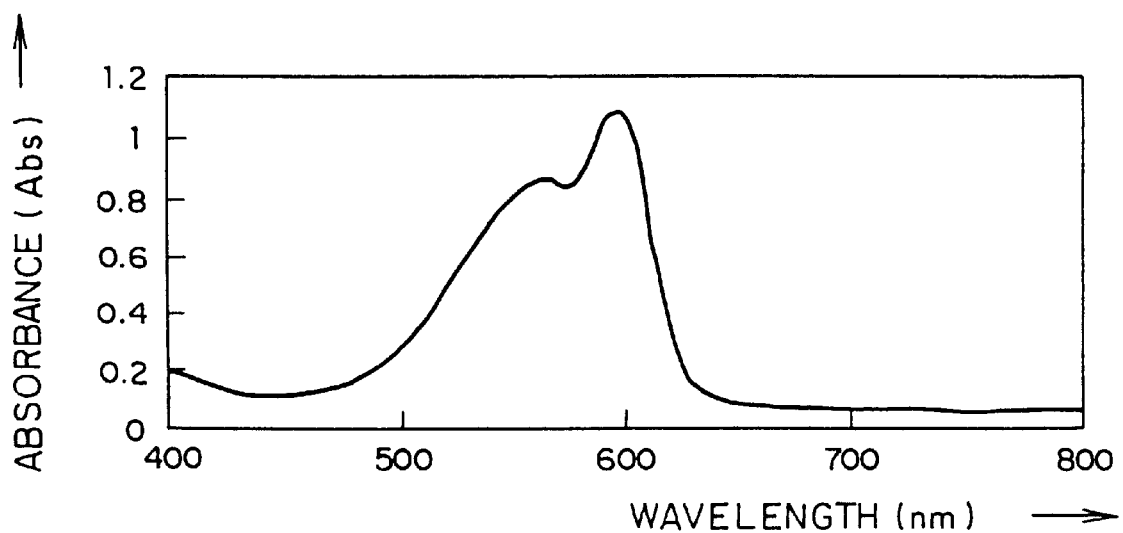
FIG. 4 is a graph showing an absorption spectrum of a recording layer comprising a dye layer containing a dye representing another example of the dyes belong to the aforementioned general formula [1] of this invention (the same kind of dye as employed in FIG. 3) and a dye belonging to the aforementioned general formula [10]

An optical disc was manufactured by forming a recording layer comprising a dye layer and processing the recording layer in the same manner as illustrated in Example 1 except that the trimethine-based cyanine dye NK-2084, a trimethine-based cyanine dye (NK-4370; Nippon Kanko-Shikiso Kenkyusho Co., Ltd.) represented by the general formula [26], and a metal complex were employed at a weight ratio of 60:35:5, respectively. Then, the measurement was performed on this recording layer in the same manner as illustrated in Example 1, the results of measurements being shown in Table 1 and in FIG. 4. The measurements on the optical disc were also performed in the same manner as described in Example 1, the results of measurement being shown in Table 1.

[26]

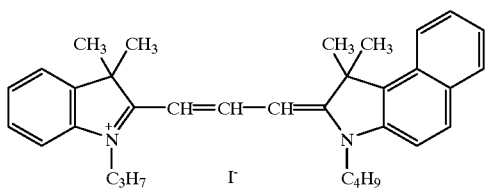

Although the optical disc of this example is featured in that a trimethine-based cyanine dye NK-2084 belonging to the general formula [1] was co-used with a trimethine-based cyanine dye NK-4370 belonging to the general formula [10] at a mixing ratio of 60:35 in weight ratio, it was possible to perform the recording with a laser beam of 635nm in wavelength and to perform the reading with a laser beam of 650 nm in wavelength. Jitter was higher than that of Examples 1 and 2, and the modulation amplitude was also slightly deteriorated from that of Examples 1 and 2. However, these values were found to meet the standards.

EXAMPLE 4

An optical disc was manufactured by forming a recording layer comprising a dye layer and processing the recording layer in the same manner as illustrated in Example 2 except that although the trimethine-based cyanine dye represented by the formula [25] was employed, the metal complex represented by the formula [24] was not employed. Then, the measurement was performed on this recording layer in the same manner as illustrated in Example 1, the results of measurements being shown in Table 1 (the absorption spectrum, the calculated value of $h_2/h_1$ based on this absorption spectrum, and "d" are almost the same as those shown in FIG. 2). The measurements on the optical disc were also performed in the same manner as described in Example 1, the results of measurement being shown in Table 1.

Although a metal complex was not employed as a light stabilizer in the optical disc of this example, it was possible to perform the recording with a laser beam of 635 nm in wavelength and to perform the reading with a laser beam of 650 nm in wavelength. Jitter was not so high, and the modulation amplitude was slightly better than those of Examples 1 and 2. However, the light resistance test thereof indicated a poor result.

COMPARATIVE EXAMPLE 1

Figure 5:
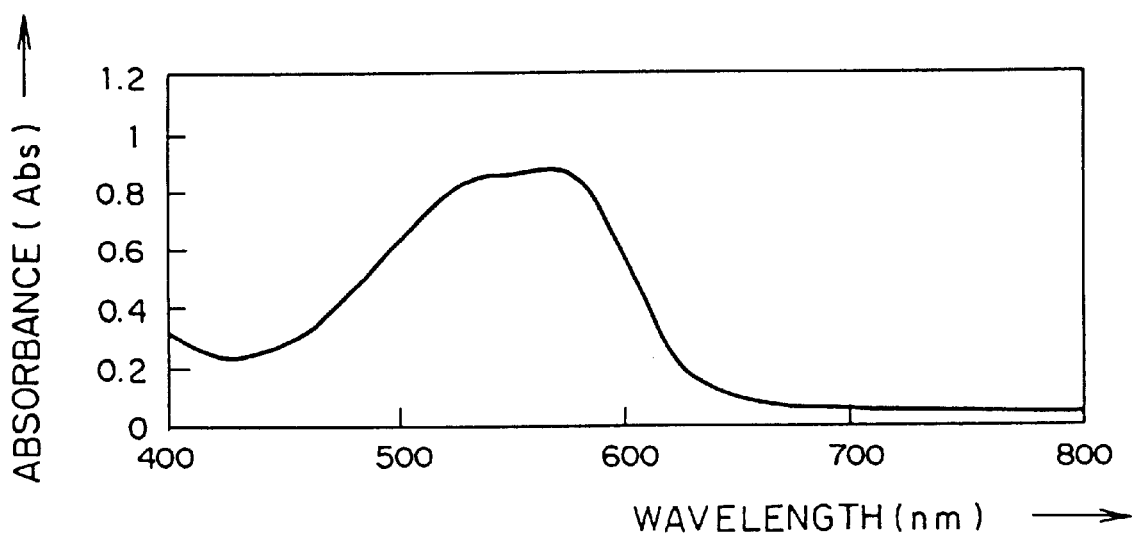
FIG. 5 is a graph showing an absorption spectrum of a recording layer comprising a dye layer containing an azo dye.

An optical disc was manufactured by forming a recording layer comprising a dye layer and processing the recording layer in the same manner as illustrated in Example 1 except that an azo dye (Product No. 36,482, Disperse Red 13, Aldrich Co., Ltd.) was substituted for the trimethine-based dye NK-2084, and the metal complex represented by the formula [24] was not employed. Then, the measurement was performed on this recording layer in the same manner as illustrated in Example 1, the results of measurements being shown in FIG. 5 and in Table 1. The measurements on the optical disc were also performed in the same manner as described in Example 1, the results of measurement being shown in Table 1.

In the optical disc of this comparative example, an azo dye which, of course, not only does not belong to the aforementioned general formula [1] but also does not belong to cyanine dye was employed and a metal complex was not employed as a light stabilizer. As a result, the absorbance ratio of the second peak/the main peak, as well as the half value width of the spectrum consisting of the main peak and the second peak were both larger than those of the above examples. Jitter was also out of the standards. The light resistance test thereof also indicated a poor result.

As explained above, there are clear differences between the products of this invention and the product of the comparative example with respect to the absorbance ratio of the second peak/the main peak, as well as to the half value width of the spectrum. Namely, the absorption peak of any the recording layer of the Examples was found more sharp as compared with that of Comparative Example. This fact is clearly reflected on the jitter characteristics. Further, when a metal complex was co-used as a light stabilizer, the light resistance of the recording layer was greatly improved.

According to this invention, the absorbance ratio between the second peak and the main peak with respect to a laser beam of short wavelength for the recording of DVD in particular can be greatly improved, and at the same time, the half value width of the spectrum consisting of these peaks can be minimized, thus making it possible to obtain an optical disc exhibiting a sharp peak of the spectrum. As a result, it is possible to provide a recording layer which is high in recording sensitivity and thin in film thickness, and at the same time, to provide an optical information recording medium which is excellent in characteristics in terms of modulation amplitude, jitter, etc., and makes it possible to perform a high-speed recording with a small power.

What is claimed is:

1. An optical information recording medium comprising a substrate on which a recording layer including a dye layer is formed; which is characterized in that said dye layer contains a trimethine-based cyanine dye represented by the following general formula [1]; and that said recording layer enables a recording and reading to be effected with a laser beam having a wavelength falling within a range of 620 nm to 690 nm; and that an absorbance ratio (h2/h1) of the second peak h2 to the main peak h1 as measured of the absorption spectrum of the recording layer (the wavelength dependency of the absorbance under a wavelength ranging from 400 to 800 nm) by making use of a visible ultraviolet spectrometer is less than 0.8:

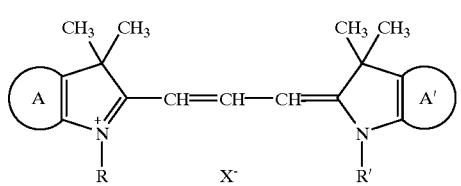

[1]

wherein "A" represents any one of the following general formulas [2], [3], [4] and [5];

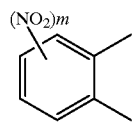

[2]

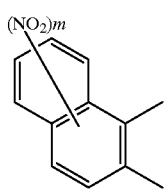

[3]

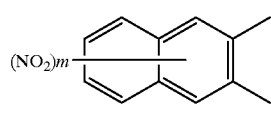

[4]

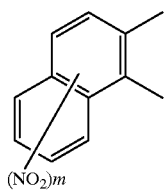

[5]

"A'" represents any one of the following general formulas [6], [7], [8] and [9];

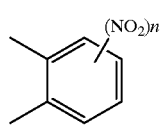

[6]

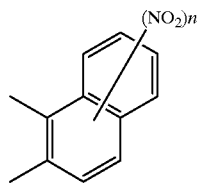

[7]

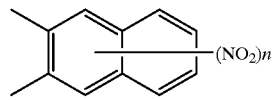

[8]

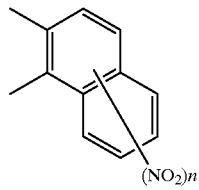

[9]

"A" and "A'" may be the same or different from each other (where m and n respectively represents an integer of 1 or more); R and R' may be the same or different from each other and are individually substituted or unsubstituted alkyl, carboxyl, alkoxycarbonyl, alkylcarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxyl, alkyl halide, alkylsulfonyl, alkylcarboxyl or alkylsulfonyl which are bonded to a metallic ion or alkyl, phenyl, benzyl, alkylphenyl, or phenoxyalkyl group (the hydrogen atom in the benzene ring portion and/or alkyl group portion may be substituted by a substituent group other than a metallic ion, such as alkyl, carboxyl, hydroxyl and a halogen atom); and X- is an anion selected from the group consisting of halogen atoms, PF6-, SbF6-, H3P04, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid, SCN-, tetraphenyl borate and tungstic acid.

2. The optical information recording medium according to claim 1, wherein said dye layer further comprises, in addition to the trimethine-based cyanine dye represented by the aforementioned general formula [1], other kinds of dye at a ratio where the trimethine-based cyanine dye represented by the aforementioned general formula [1] occupies at least 50% by weight based on the total quantity of dyes.

3. The optical information recording medium according to claim 2, wherein said other kinds of dye are trimethine-based cyanine dyes represented by the following general formula [10];

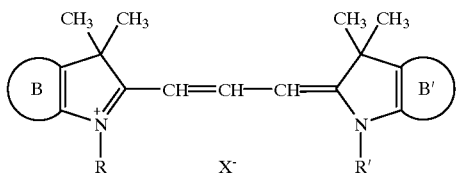

[10]

wherein "B" represents any one of the following general formulas [11], [12], [13] and [14];

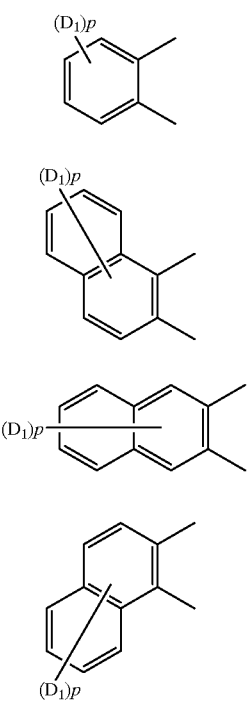

"B'" represents any one of the following general formulas [15], [16], [17] and [18];

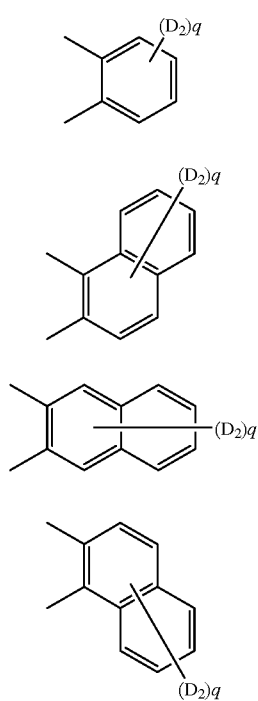

"B" and "B'" may be the same or different from each other (where $D_1$ and $D_2$ may be the same or different from each other and are individually hydrogen atom, alkyl, alkoxyl, hydroxyl, halogen atoms, carboxyl, alkoxycarbonyl, alkylcarboxyl, alkylhydroxyl, aralkyl, alkenyl, alkylamide, alkylamino, alkylsufonamide, alkylcarbamoyl, alkylsulfamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapt, chlorosulfone, alkylazomethine, alkylaminosulfone, vinyl or sulfone group; p and q respectively represents the number of substituent groups, which is an integer of 1 or more; (however, the case where $D_1$ and $D_2$ are simultaneously nitro group is excluded); and "R" and "R'" are the same as those of the aforementioned general formula [1]).

4. The optical information recording medium according to claim 1, wherein said recording layer further comprises a metal complex.

5. The optical information recording medium according to claim 2, wherein said recording layer further comprises a metal complex.

6. The optical information recording medium according to claim 3, wherein said recording layer further comprises a metal complex.

7. The optical information recording medium according to claim 4, wherein said metal complex is represented by the following general formulas [19];

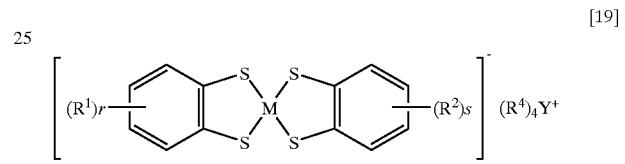

wherein $R^1$ and $R^2$ are respectively $SO_2R^3$ ( $R^3$ is represented by the general formula [20])

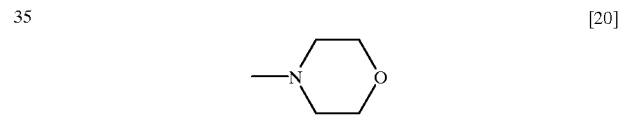

halogen atom, phenyl, alkyl, cyano, thioalkyl or alkylsulfonyl; r and s are respectively an integer of 1 to 4; $R^4$ is alkyl group; Y is N or P; and M is a metal such as Cu, Co and Ni.

8. The optical information recording medium according to claim 5, wherein said metal complex is represented by the following general formulas [19];

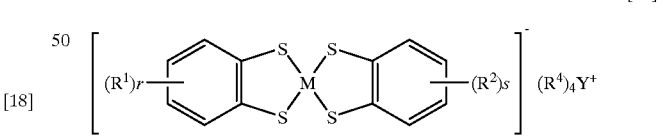

wherein $R^1$ and $R^2$ are respectively $SO_2R^3$ ($R^3$ is represented by the general formula [20])

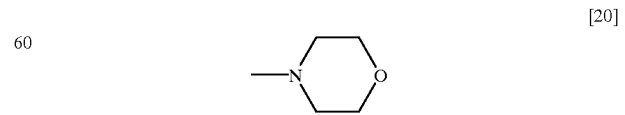

halogen atom, phenyl, alkyl, cyano, thioalkyl or alkylsulfonyl; r and s are respectively an integer of 1 to 4; $R^4$ is alkyl group; Y is N or P; and M is a metal such as Cu, Co and Ni.

9. The optical information recording medium according to claim 6, wherein said metal complex is represented by the following general formulas [19];

[19]

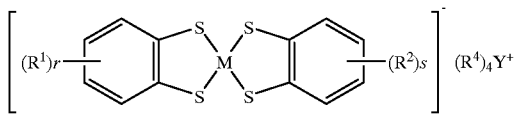

wherein $R^1$ and $R^2$ are respectively $SO_2R^3$ ($R^3$ is represented by the general formula [20])

[20]

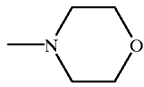

halogen atom, phenyl, alkyl, cyano, thioalkyl or alkylsulfonyl; r and s are respectively an integer of 1 to 4; $R^4$ is alkyl group; Y is N or P; and M is a metal such as Cu, Co and Ni.

10. The optical information recording medium according to claim 1, wherein said recording layer exhibits a maximum absorption peak (main peak) wavelength and a second largest absorption peak (second peak) wavelength falling within a range of 500 nm to 655 nm as measured by means of a visible ultraviolet spectrometer.

11. The optical information recording medium according to claim 3, wherein said recording layer exhibits a maximum absorption peak (main peak) wavelength and a second largest absorption peak (second peak) wavelength falling within a range of 500 nm to 655 nm as measured by means of a visible ultraviolet spectrometer.

12. The optical information recording medium according to claim 7, wherein said recording layer exhibits a maximum absorption peak (main peak) wavelength and a second largest absorption peak (second peak) wavelength falling within a range of 500 nm to 655 nm as measured by means of a visible ultraviolet spectrometer.

13. The optical information recording medium according to claim 9, wherein said recording layer exhibits a maximum absorption peak (main peak) wavelength and a second largest absorption peak (second peak) wavelength falling within a range of 500 nm to 655 nm as measured by means of a visible ultraviolet spectrometer.

14. The optical information recording medium according to claim 1, wherein an absorbance ratio ($h_2/h_1$) of the second peak $h_2$ to the main peak $h_1$ as measured of the absorption spectrum of the recording layer (the wavelength dependency of the absorbance under a wavelength ranging from 400 to 800 nm) by making use of a visible ultraviolet spectrometer is less than 0.8; and a half value width of the spectrum consisting of the main peak and the second peak is 100 nm.

15. The optical information recording medium according to claim 10, wherein an absorbance ratio ($h_2/h_1$) of the second peak $h_2$ to the main peak $h_1$ as measured of the absorption spectrum of the recording layer (the wavelength dependency of the absorbance under a wavelength ranging from 400 to 800 nm) by making use of a visible ultraviolet spectrometer is less than 0.8; and a half value width of the spectrum consisting of the main peak and the second peak is 100 nm.

16. The optical information recording medium according to claim 11, wherein an absorbance ratio ($h_2/h_1$) of the second peak $h_2$ to the main peak $h_1$ as measured of the absorption spectrum of the recording layer (the wavelength dependency of the absorbance under a wavelength ranging from 400 to 800 nm) by making use of a visible ultraviolet spectrometer is less than 0.8; and a half value width of the spectrum consisting of the main peak and the second peak is 100 nm.

17. The optical information recording medium according to claim 12, wherein an absorbance ratio ($h_2/h_1$) of the second peak $h_2$ to the main peak $h_1$ as measured of the absorption spectrum of the recording layer (the wavelength dependency of the absorbance under a wavelength ranging from 400 to 800 nm) by making use of a visible ultraviolet spectrometer is less than 0.8; and a half value width of the spectrum consisting of the main peak and the second peak is 100 nm.

18. The optical information recording medium according to claim 13, wherein an absorbance ratio ($h_2/h_1$) of the second peak $h_2$ to the main peak $h_1$ as measured of the absorption spectrum of the recording layer (the wavelength dependency of the absorbance under a wavelength ranging from 400 to 800 nm) by making use of a visible ultraviolet spectrometer is less than 0.8; and a half value width of the spectrum consisting of the main peak and the second peak is 100 nm.

19. The optical information recording medium according to claim 1, wherein a jitter is less than 8.5%, and a modulation amplitude is 70% or more.

20. The optical information recording medium according to claim 15, wherein a jitter is less than 8.5%, and a modulation amplitude is 70% or more.

* * * * *